July 29, 1947.  O. M. OWSLEY  2,424,843
SELF-SYNCHRONOUS REMOTE CONTROL SYSTEM
Filed Oct. 17, 1944
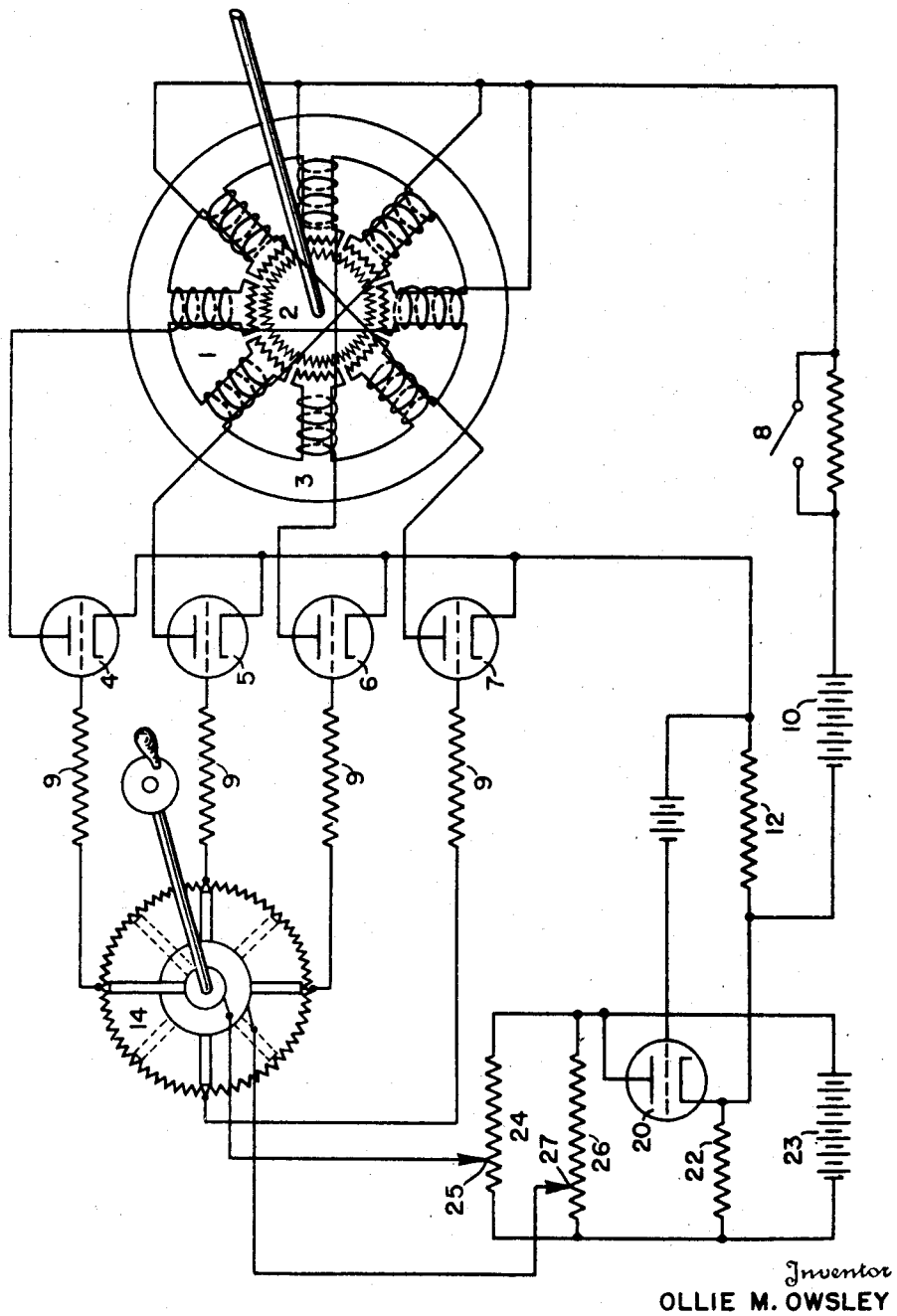
Inventor
OLLIE M. OWSLEY Patented July 29, 1947

2,424,843

UNITED STATES PATENT OFFICE 2,424,843

SELF-SYNCHRONOUS REMOTE-CONTROL SYSTEM

Ollie M. Owsley, Alexandria, Va.

Application October 17, 1944, Serial No. 559,106

14 Claims. (Cl. 318—20)

(Granted under the act of March 3, 1883, as amended April 30, 1928; 370 O. G. 757)

This invention relates to remote control systems whereby the angular position of an object may be determined and observed from the controlling station.

In the art to which this invention pertains means have been provided, including a synchronous motor, which will keep in step with a controlling motion, but it is necessary from time to time to permit the controlling means to be disconnected in order to synchronize the synchronous motor with its controller. This is done by cutting off the motor and operating the controller until an indicator in conjunction therewith occupies the position corresponding to the position of the motor controlled thereby. Then the motor circuit is again connected. However, it has been found that opening the motor circuit causes a very heavy transient to traverse the circuit, which in time injures the motor and circuits. Furthermore when the motor circuit is open, if there is any load on the motor, the motor will tend to rotate causing increased difficulty in making the adjustment.

It is an object of this invention to provide an arrangement which will permit the synchronizing of a motor and its controlling device without subjecting the motor or its circuits to high potential transients.

It is another object of this invention to provide an arrangement of the class described in which the motor may be locked to prevent rotation while it is being synchronized.

These and other objects of this invention will be apparent from the following specification taken in connection with the appended claims.

In accomplishing the objects of this invention, the common lead of the rotating field circuits of the motor is provided with a synchronizing switch, which will break all the field circuits at one time when it is desired to bring the motor and its controller back into synchronism. Then to prevent the operation of the switch from causing heavy transients a resistance is connected across the switch. The purpose of the resistance is to keep all the motor circuits in operation, but to cause them each to have the same current so that the motor will be locked in position while the synchronizing is being done. This is accomplished as follows:

When the current in the common motor circuit is reduced, the current drops across the circuit comprising the controlling tube and resistance in series. The heavy current normally passing through this circuit produces an IR drop across this resistance which reduces the high positive potential which would otherwise be supplied to the grids of each of the field supply tubes. When this current is thus reduced by opening the synchronizing switch, the tubes are all supplied with a high positive bias causing them to draw grid current. This latter permits the individual grid leaks to bias the tubes so that they will each draw about the same amount of plate current.

Having thus briefly described the invention, attention is invited to the accompanying drawings in which the single figure is a schematic drawing showing all of the essential features of the invention.

Referring now more particularly to the drawings there is generally indicated at I, the remote controlled motor, which comprises a rotor 2 and stator 3, the latter of which comprises eight pairs of opposed poles, opposite pairs of which are connected into the same circuit. For supplying current to the field windings, there are provided the four field supply tubes 4, 5, 6, and 7. A grid leak 9 is provided in the grid circuit of each of these field supply tubes and the plate circuit of the tubes are completed through the field windings, switch 8, high potential source 10, and control resistance 12.

The rotation of the motor is controlled by the controller 14, by which the bias of the field supply tubes may be sequentially varied by means of which a precisely controlled rotating field is obtained. The controller 14 serves to control the bias on the tubes 4—7 as follows:

The bias voltage source 23 has shunted across it two potentiometers 24 and 26, and also the bias control tube 20 and the resistance 22 in series. The grid return is from the common point of the resistor 22, and tube 20 through resistance 12 so that the positive potentials of the contact points on the resistances 24 and 26 are more than offset by the IR drop across 22 when the tube 20 is drawing current under condition of normal operation.

The contact point 25 on potentiometer 24 is so selected that under this condition a grid connected to it will cause its tube to have maximum plate current. On the other hand, the contact point 27 on potentiometer 26 is selected so that under normal conditions tubes having their grids connected to it will be biased approximately to cut off and draw substantially no plate current.

These potentiometers 24 and 26, with control tube 20, resistor 22, and bias voltage source 23, form a bridge network for controlling the voltage level at the junction point of resistor 22 and tube 20, and thus effectively the bias voltage level at the cathodes of field supply tubes 4—7. The portions of the resistors 24, 26 from the end of the resistors connected to the negative side of bias source 23 to the taps 25 and 27, and from the taps 25 and 27 to the other end of the resistors 24, 26 comprise one group of arms of the bridge, while the resistor 22 and control tube 20 form the opposing arms. Thus, the IR drop through resistor 12, which is proportional to the total plate current through tubes 4—7, is of proper polarity to oppose the normal bias on the grid of control tube 20 and adjusts the net bias voltage as a function of the total plate current. Variation of total plate current thus shifts the operating point of control tube 20, varying its plate resistance, thus the voltage division between the arms 22 and 20 of the bridge and the voltage tapped off at the junction of these arms. Since the voltage level at potentiometer taps 25, 27 remains substantially constant, the controlled variations in plate resistance of tube 20 alter the voltage on the cathodes of tubes 4—7, connected to the junction of arms 22, 20, to vary the bias on tubes 4—7 in an inverse relation to the variation in total plate current through the tubes. The values of these circuit elements are selected empirically to maintain the total plate current through resistor 12 substantially constant.

The controller 14 is so arranged that one of the four tubes may be connected to either the contact 25 or the contact 27 or may be supplied by means of the circular resistor with any bias voltage in between these extremes. At the same time the remaining tubes are connected to either the contact point 27 or one of them may be supplied with a voltage intermediate that of contact 27 and that of contact 25.

Thus as the controller is rotated, the tubes 4, 5, 6, and 7 are sequentially biased to permit maximum plate current and gradually a reduction of current to substantially no plate current as the grids are directly connected to the contact point 27. This produces a rotating field as the controller is rotated and the armature 2 will move in step therewith in a well known manner.

When, however, the synchronizing switch is opened and the resistor 11, coupled across switch 8, is thus inserted into the circuit, the flow of current through resistor 12 is decreased. This reduction of current is of such a magnitude that the reduction in the bias on the grid of control tube 20 is not great enough to bring the total plate current, by varying the correcting bias on tubes 4—7, back to its normal value. This decrease in current merely biases the control tube 20 substantially at cut off, causing the tube to operate in a very high plate resistance region, thus altering the voltage division at the junction of bridge arms 22 and 20 to place a very low bias voltage on the cathodes of field tubes 4—7, and carrying the operating point of the tubes into the positive or plate current saturation region. Since a sizeable grid current is drawn in this region, the grid leak resistances 9 will establish the bias on each of the tubes whereby they will all have substantially the same plate current irrespective of the position of controller 14. In this condition, the current through each of the field coils 3 will be substantially equal, thus effectively locking the armature 2 in position to allow the controller 14 to be rotated independently.

Furthermore, since the plate circuits are never opened, there will be no high voltage transients to deteriorate the field coils or other parts of the circuits.

Accordingly it can be seen that there has been provided an arrangement which will accomplish the objects of the invention.

Having thus described the invention, attention is called to the fact that this invention is not limited to the specific embodiment shown and described for the purposes of illustration, but by the scope of the invention as set forth and determined in the following claims.

The invention described herein may be manufactured and used by or for the Government of the United States of America for governmental purposes without the payment of any royalties thereon or therefor.

What is claimed is:

1. In a system of the class described a synchronous motor, an input circuit for said motor comprising two or more vacuum tube relays, adjustable biasing means for said relay tubes, including a commutator for sequentially varying the bias of the relays and therefore the current in the windings of said motor to control its operation, a motor common return between the cathode of each of said relay tubes and the opposite side of said motor, means associated with said common return for causing the total motor current to tend to remain constant, and a synchronizing switch shunted by a resistance connected in said common return, whereby when said synchronizing switch is opened to permit operation of the commutator to bring it into synchronism with the motor all the relay tubes will be biased to maximum current regardless of the position of the contacts on said commutator and the motor will be locked in position.

2. In a system of the class described, a synchronous motor, an input circuit for said motor comprising two or more vacuum tube relays, adjustable biasing means for said relay tubes, including a hand operated commutator for sequentially varying the bias of the relays and therefore the current in the windings of said motor to control its operation, a motor common return between the cathode of each of said relay tubes and the opposite side of said motor, means associated with said common return for causing the total motor current to tend to remain constant, and a synchronizing switch shunted by a resistance connected in said common return, whereby when said synchronizing switch is opened to permit independent operation of the commutator to bring it into synchronism with the motor all the relay tubes will be biased to maximum current regardless of the position of the contact on said commutator and the motor will be locked in position.

3. In a system of the class described a synchronous motor, an input circuit for said motor comprising two or more vacuum tube relays, a fixed grid leak biasing resistor in the input of each of said tubes, adjustable biasing means for said relay tubes, including a commutator for sequentially varying the bias on the relays, and therefore the current in the windings of said motor to control its operation, bias control means for controlling the bias supplied by said commutator to cause the total motor current to remain constant, a synchronizing switch, shunted by a resistor, connected in the input of the circuit traversed by the total motor current whereby when said synchronizing switch is opened to permit independent operation of the commutator to bring it into synchronism with the motor, all of the relay tubes, in an effort of the bias control means to maintain constant current, will be biased to draw grid current and therefore be controlled by their respective biasing resistors to have maximum plate current and the motor will be locked in position.

4. In a system of the class described, a synchronous motor, an input circuit for said motor comprising two or more vacuum tube relays, a fixed grid leak biasing resistor in the input of each of said tubes, adjustable biasing means for said relay tubes, including a hand operated commutator for sequentially varying the bias on the relays, and therefore the current in the windings of said motor to control its operation, bias control means for controlling the bias supplied by said commutator to cause the total motor current to remain constant, a synchronizing switch, shunted by a resistor, connected in the input of the circuit traversed by the total motor current whereby when said synchronizing switch is opened to permit independent operation of the commutator to bring it into synchronism with the motor, all of the relay tubes in an effort of the bias control means to maintain constant current, will be biased to draw grid current and therefore be controlled by their respective biasing resistors to have maximum plate current and the motor will be locked in position.

5. In a system of the class described, a synchronous motor, an input circuit for said motor comprising two or more vacuum tube relays, adjustable biasing means for said relay tubes including a commutator for sequentially varying the bias of the relays and therefore the current in the windings of said motor to control its operation, bias control means for controlling the bias supplied by said commutator to cause the total motor current to remain constant, a synchronizing switch shunted by a resistor connected in a part of the circuit traversed by the total motor current, whereby when said synchronizing switch is opened to permit independent operation of the commutator to bring it into synchronism with the motor, all the relay tubes, in an effort of the bias control means to maintain constant current, will be biased to maximum current regardless of the position of the commutator and the motor will be locked in position.

6. In a system of the class described, a synchronous motor, an input circuit for said motor, comprising two or more vacuum tube relays, adjustable biasing means for said relay tubes including a hand operated commutator for sequentially varying the bias of the relays and therefore the current in the windings of said motor to control its operation, bias control means for controlling the bias supplied by said commutator to cause the total motor current to remain constant, a synchronizing switch shunted by a resistor connected in a part of the circuit traversed by the total motor current, whereby when said synchronizing switch is opened to permit independent operation of the commutator to bring it into synchronism with the motor, all the relay tubes, in an effort of the bias control means to maintain constant current, will be biased to maximum current regardless of the position of the commutator and the motor will be locked in position.

7. In a system of the class described, a synchronizing motor; an input circuit for said motor, comprising two or more vacuum tube relays including adjustable biasing means, which latter comprises a source of biasing potential, potentiometers cononected across said biasing source, a regulating tube and a control resistor also connected across said biasing source and a commutator for sequentially varying the bias on the relays from the potential of the contact point on one of said potentiometers to that of the contact point on another of said potentiometers and therefore the current in the windings of said motor to control its operation; a motor common return connected between the cathode of each of said relay tubes and the opposite side of said motor said return including the regulating resistor, a source of high potential voltage, a synchronizing switch shunted by a resistor, and connections for supplying the potential drop, which exists across the said regulating resistor to the input of said regulating tube, whereby when said synchronizing switch is opened to permit independent operation of the commutator to bring it into synchronism with the motor the regulating tube will become substantially non-conducting, the voltage drop across the bias controlling resistor will become small and the relay tubes will be biased to maximum current regardless of the position of the commutator and the motor will be locked in position.

8. In a system of the class described, a synchronous motor; an input circuit for said motor, comprising two or more vacuum tube relays and including adjustable biasing means, which latter comprises a source of biasing potential, potentiometers connected across said biasing source, a regulating tube and a biasing control resistor also connected across the said biasing source, and a hand operated commutator for sequentially varying the bias on the relay tubes from that on the contact point on one potentiometer to that of the contact point on another of said potentiometers and therefore the current in the windings of said motor to control its operation; a motor common return connected between the cathode of each of said relay tubes and the opposite side of said motor, said return including a regulating resistor, a source of high potential voltage, a synchronizing switch shunted by a resistor; and connections for supplying the potential drop, which exists across the said regulating resistor to the input of said regulating tube; whereby when said synchronizing switch is opened to permit independent operation of the commutator to bring it into sychronism with the motor, the regulating tube will become substantially non-conducting, the voltage drop across the bias control resistor will become small and all the relay tubes will be biased to maximum current regardless of the position of the commutator and the motor will be locked in position.

9. In a system of the class described, a synchronizing motor, an input circuit for said motor, comprising two or more vacuum tube relays and including adjustable biasing means, comprising a source of biasing potential, potentiometers connected across said biasing source, a regulating tube and a biasing control resistor also connected across said biasing source and a commutator for sequentially varying the bias on the relays from that of the contact point on one of said potentiometers to that of the contact point on another of said potentiometers and therefore the current in the windings of said motor to control its operation; a motor common return between the cathode of each of said relay tubes and the opposite side of said motor, a synchronizing switch shunted by a resistor in said motor common return; and means for regulating the conductivity of the regulating tubes to maintain a substantially constant current, whereby when said synchronizing switch is open to permit independent operation of the commutator to bring it into synchronism with the motor, the regulating tube will become substantially non-conducting, the voltage drop across the biasing control resistor will become small and all the relays will be biased to maximum current regardless of the position of the commutator and the motor will be locked in position.

10. In a system of the class described, a synchronizing motor, an input circuit for said motor, comprising two or more vacuum tube relays and including adjustable biasing means, comprising a source of biasing potential potentiometers connected across said biasing source, a regulating tube and a biasing control resistor also connected across said biasing source and a hand operated commutator for sequentially varying the bias on the said relays from that of the contact point on one of said potentiometers to that of the contact point on another of said potentiometers and therefore the current in the windings of said motor to control its operation; a motor common return between the cathode of each of said relay tubes and the opposite side of said motor, a synchronizing switch shunted by a resistor in said motor common return; and means for regulating the conductivity of the regulating tubes to maintain a substantially constant current, whereby when said synchronizing switch is open to permit independent operation of the commutator to bring it into synchronism with the motor, the regulating tube will become substantially nonconducting, the voltage drop across the biasing control resistor will become small and all the relays will be biased to maximum current regardless of the position of the commutator and the motor will be locked in position.

11. In a system of the class described, a synchronous motor, including two or more pairs of poles; an input circuit for each of said pairs of poles, each of said input circuits comprising a vacuum tube relay; an input circuit for each of said vacuum tube relays, said last mentioned input circuits including adjustable biasing means, comprising a source of biasing potential, two potentiometers connected across said biasing source, a regulating tube and a biasing control resistor in series, also connected across said biasing source, a hand operated commutator including sliding contacts for sequentially varying the bias on the relays from that of the contact point on one of said potentiometers to that of the contact point on the other potentiometer and therefore the current in the windings of the pairs of poles to control operation of the motor, and a connection from the adjustable contact points on said potentiometers to the sliding contacts on said commutator; a motor common return connected between the cathode of each of said relay tubes and the opposite side of said pairs of poles, said return including a regulating resistor, a source of high potential voltage, a synchronizing switch shunted by a resistor; and connections for supplying the potential drop, which exists across the said regulating resistor to the input of said regulating tube; whereby when said synchronizing switch is opened to permit independent operation of the commutator to bring it into synchronism with the motor, the regulating tube will become substantially nonconducting, the voltage drop across the bias control resistor will become small and all the relay tubes will be biased to maximum current regardless of the position of the commutator and the motor will be locked in position.

12. In a system of the class described, a synchronous motor, including two or more pairs of poles; an input circuit for each of said pairs of poles, each of said input circuits comprising a vacuum tube relay; an input circuit for each of said vacuum tube relays, said last mentioned input circuits including adjustable biasing means, comprising a source of biasing potential, two potentiometers connected across said biasing source, a regulating tube and a biasing control resistor in series, also connected across said biasing source, a commutator including sliding contacts for sequentially varying the bias on the relays from that of the contact point on one of said potentiometers to that of the contact point on the other potentiometer and therefore the current in the windings in the pairs of poles to control the operation of the motor, and a connection from the adjustable contact points on said potentiometers to the sliding contacts on said commutator; a motor common return connected between the cathode of each of said relay tubes and the opposite side of said pairs of poles, said return including a regulating resistor, a source of high potential voltage, a synchronizing switch shunted by a resistor; and connections for supplying the potential drop, which exists across the said regulating resistor to the input of said regulating tube; whereby when said synchronizing switch is opened to permit independent operation of the commutator to bring it into synchronism with the motor, the regulating tube will become substantially non-conducting, the voltage drop across the bias control resistor will become small and all the relay tubes will be biased to maximum current regardless of the position of the commutator and the motor will be locked in position.

13. In a system of the class described, a synchronous motor; an input circuit for said motor, comprising two or more vacuum tube relays; an input circuit for each of said vacuum tube relays, said last mentioned input circuits including adjustable biasing means, comprising a source of biasing potential, two potentiometers connected across said biasing source, a regulating tube and a biasing control resistor in series also connected across said biasing source, a commutator including sliding contacts for sequentially varying the bias on said relays from the voltage of the contact point of one of said potentiometers to that of the contact point of the other of said potentiometers and therefore the current in said motor to control its operation, a motor common return connected between the cathode of each of said relay tubes and the opposite side of said motor, said return including a regulating resistor, a source of high potential voltage, a synchronizing switch shunted by a resistor; and connections for supplying the potential drop which exists across the said regulating resistor to the input of said regulating tube; whereby when said synchronizing switch is opened to permit independent operation of the commutator to bring it into synchronism with the motor, the regulating tube will become substantially nonconducting, the voltage drop across the bias control resistor will become small and all the relay tubes will be biased to maximum current, regardless of the position of the commutator and the motor will be locked in position.

14. In a system of the class described, a synchronous motor; an input circuit for said motor, comprising two or more vacuum tube relays; an input circuit for each of said vacuum tube relays, said last mentioned input circuit including adjustable biasing means, comprising a source of biasing potential, two potentiometers connected across said biasing source, a regulating tube and a biasing control resistor in series also connected across said biasing source, a hand operated commutator including sliding contacts for sequentially varying the bias on said relays from the voltage of the contact point of one of said potentiometers to that of the contact point of the other of said potentiometers and therefore the current in said motor to control its operation, a motor common return connected between the cathode of each of said relay tubes and the opposite side of said motor, said return including a regulating resistor, a source of high potential voltage, a synchronizing switch shunted by a resistor; and connections for supplying the potential drop which exists across the said regulating resistor to the input of said regulating tube; whereby when said synchronizing switch is opened to permit independent operation of the commutator to bring it into synchronism with the motor, the regulating tube will become substantially non-conducting, the voltage drop across the bias control resistor will become small and all the relay tubes will be biased to maximum current regardless of the position of the commutator, and the motor will be locked in position.

OLLIE M. OWSLEY.

REFERENCES CITED

The following references are of record in the file of this patent:

UNITED STATES PATENTS

| Number | Name | Date |
|---|---|---|
| 2,225,032 | Carbonara | Dec. 17, 1940 |
| 2,276,652 | Harding et al. | Mar. 17, 1942 |